United States Patent
Driediger et al.

(10) Patent No.: US 7,424,652 B2
(45) Date of Patent: Sep. 9, 2008

(54) METHOD AND APPARATUS FOR DETECTION OF TRANSMISSION UNIT LOSS AND/OR REPLICATION

(75) Inventors: Steven Driediger, Kanata (CA); Simon Paul Creasy, Ottawa (CA)

(73) Assignee: Alcatel Lucent, Paris (FR)

( * ) Notice: Subject to any disclaimer, the term of this patent is extended or adjusted under 35 U.S.C. 154(b) by 494 days.

(21) Appl. No.: 10/717,377

(22) Filed: Nov. 19, 2003

(65) Prior Publication Data

US 2005/0108601 A1    May 19, 2005

(51) Int. Cl.
*G01R 31/28*    (2006.01)
*G06F 11/00*    (2006.01)

(52) U.S. Cl. ........................ 714/712; 714/706
(58) Field of Classification Search ................. 714/712, 714/704, 706, 715, 819, 776
See application file for complete search history.

(56) References Cited

U.S. PATENT DOCUMENTS

| | | | | |
|---|---|---|---|---|
| 4,052,566 A * | 10/1977 | MacKay | ...................... | 370/458 |
| 5,142,653 A * | 8/1992 | Schefts | ........................ | 370/253 |
| 5,293,556 A * | 3/1994 | Hill et al. | .................... | 702/184 |
| 5,475,696 A * | 12/1995 | Taniguchi | .................... | 714/775 |
| 6,049,530 A | 4/2000 | Petersen et al. | | |
| 6,115,417 A * | 9/2000 | Matsunaga et al. | .......... | 375/226 |
| 6,167,025 A | 12/2000 | Hsing et al. | | |
| 6,333,915 B1 * | 12/2001 | Fujita | ......................... | 370/223 |
| 6,597,689 B1 | 7/2003 | Chiu et al. | | |
| 6,636,484 B1 | 10/2003 | Agrawal et al. | | |
| 6,763,024 B1 * | 7/2004 | Law et al. | ................. | 370/395.1 |
| 6,765,906 B1 * | 7/2004 | Suzuki | ........................ | 370/389 |
| 6,937,621 B2 * | 8/2005 | Samrao et al. | .............. | 370/516 |
| 6,965,737 B1 * | 11/2005 | Somashekhar | ................ | 398/54 |
| 7,047,459 B2 * | 5/2006 | Chuah et al. | ................. | 714/716 |

FOREIGN PATENT DOCUMENTS

EP    1 109 366 A1    6/2001

* cited by examiner

*Primary Examiner*—Phung M Chung

(57) ABSTRACT

One embodiment of the disclosures made herein is a method of detecting a transmission unit fault condition in a network system. In accordance with such a method, an operation is performed for designating transmission units received at a first counting location of a datapath, during a first duration consisting of a first specified counting interval and a first specified settling interval after the first specified counting interval elapses, as first designated transmission units. An operation is performed for determining a first datapath ingress transmission unit count for the first designated transmission units at a first counting location during the first duration. An operation is performed for determining a first datapath ingress transmission unit count, an operation is performed for determining a first datapath egress transmission unit count for the first designated transmission units at a second counting location of the datapath during the first duration. After determining the first datapath ingress transmission unit count and the first datapath egress transmission unit count, an operation is performed for indicating a transmission unit fault condition associated with the first specified counting interval when a difference is determined between the first datapath ingress transmission unit count and the first datapath egress transmission unit count after the first specified settling interval elapses.

49 Claims, 9 Drawing Sheets

METHOD AND APPARATUS FOR DETECTION OF TRANSMISSION UNIT LOSS AND/OR REPLICATION

FIELD OF THE DISCLOSURE

The present invention relates generally to communication networks, and more particularly to facilitating loss and fault detection of transmission units in communication networks.

BACKGROUND

For the purposes of fault isolation in a datapath, it is desirable to detect the loss of transmission units (e.g. ATM cells, IP packets, etc), the addition of transmission units, and/or repeated transmission of transmission units. To remedy fault conditions such as loss, addition and/or repetition, it is necessary to locate the fault such as at a failed field replaceable unit (FRU) so that the failed FRU can be replaced.

In an ATM switch, for example, buffers and switch fabrics are part of the datapath through the switch. Under certain fault conditions, it is possible for a first-in-first-out (FIFO) buffer to fail in a manner that causes the FIFO buffer to repeatedly transmit a particular ATM cell. However, because in most cases the repeated copies of the particular ATM cell are not corrupted in any way, it is difficult to determine that a fault exists. Additionally, it is also possible for a fault condition in the buffers and switch fabrics to cause ATM cells to be lost as they traverse the datapath. However, because a mechanism for detecting cell loss is not provided in the ATM protocol, it is difficult to determine that a fault exists that is causing the ATM cells to be lost.

Generally speaking, detection and fault isolation of transmission unit loss/addition is much more difficult to identify than is detection of transmission unit corruption. This is because a corrupted transmission unit is typically available for inspection and analysis for showing such corruption. Detection of transmission unit loss/addition requires analysis of the transmission unit stream, rather than an individual transmission unit.

A conventional solution for evaluating fault detection in an ATM datapath includes installing a test apparatus in the ATM datapath. The test apparatus includes counters that are inserted at ingress and egress ends of the ATM datapath for counting a number of ATM cells traversing these ends. After a predetermined interval of test ATM cell traffic, the test ATM cell traffic in the datapath is stopped, thus allowing the counters to settle. Once the counters have settled, the values of the counters are compared to determine if cell loss or cell addition has occurred.

One limitation of such a conventional solution is that it is reactive rather than proactive. That is, a fault condition can only be detected when the test apparatus is in place. Another limitation is that subscriber ATM cell traffic in the datapath is stopped during flow of the test ATM cell traffic, thus adversely affecting subscriber services using the datapath. Limitations such as these make this type of conventional solution essentially incompatible with real-time background diagnostic monitoring of a datapath.

Therefore, facilitating loss and fault detection of transmission unit in a manner that overcomes limitations associated with conventional transmission unit loss and fault detection functionality is useful.

BRIEF DESCRIPTION OF THE DRAWING FIGURES

DETAILED DESCRIPTION OF THE DRAWING FIGURES

The disclosures made herein pertain to various aspects of providing fault detection for transmission units (e.g., ATM cells, IP packets and the like) in data networks, telecommunication networks or other type of network system. Fault detection is defined herein to include loss of transmission units, unintentional insertion of transmission units and the like.

In accordance with embodiments of the disclosures made herein, transmission unit counter sets are positioned at various locations of a datapath for assessing the flow of transmission units through the datapath. An Asynchronous Transfer Mode (ATM) datapath is one example of a datapath in accordance with the disclosures made herein. Each counter set includes a plurality of counters capable of facilitating a respective transmission unit count. Each counter of a transmission unit counter set facilitates counting transmission units for a particular time interval. A fault condition is identified when a discrepancy is determined between the transmission unit counts at two or more of such various locations during an associated particular time interval.

One advantage of embodiments of systems, apparatuses and methods in accordance with the disclosures made herein is that fault detection of transmission units may be facilitated without interrupting subscriber services on a datapath. The actual transmission units carrying subscriber content are used for facilitating fault detection rather than specially designated test transmission units. In this manner, fault detection is facilitated in a real-time manner without interrupting subscriber services rather than in an off-line manner where subscriber services are suspended or otherwise altered. Accordingly, fault detection is facilitated such that a loss, insertion or other fault condition is capable of being identified and addressed proactively rather than reactively.

Figure 1:
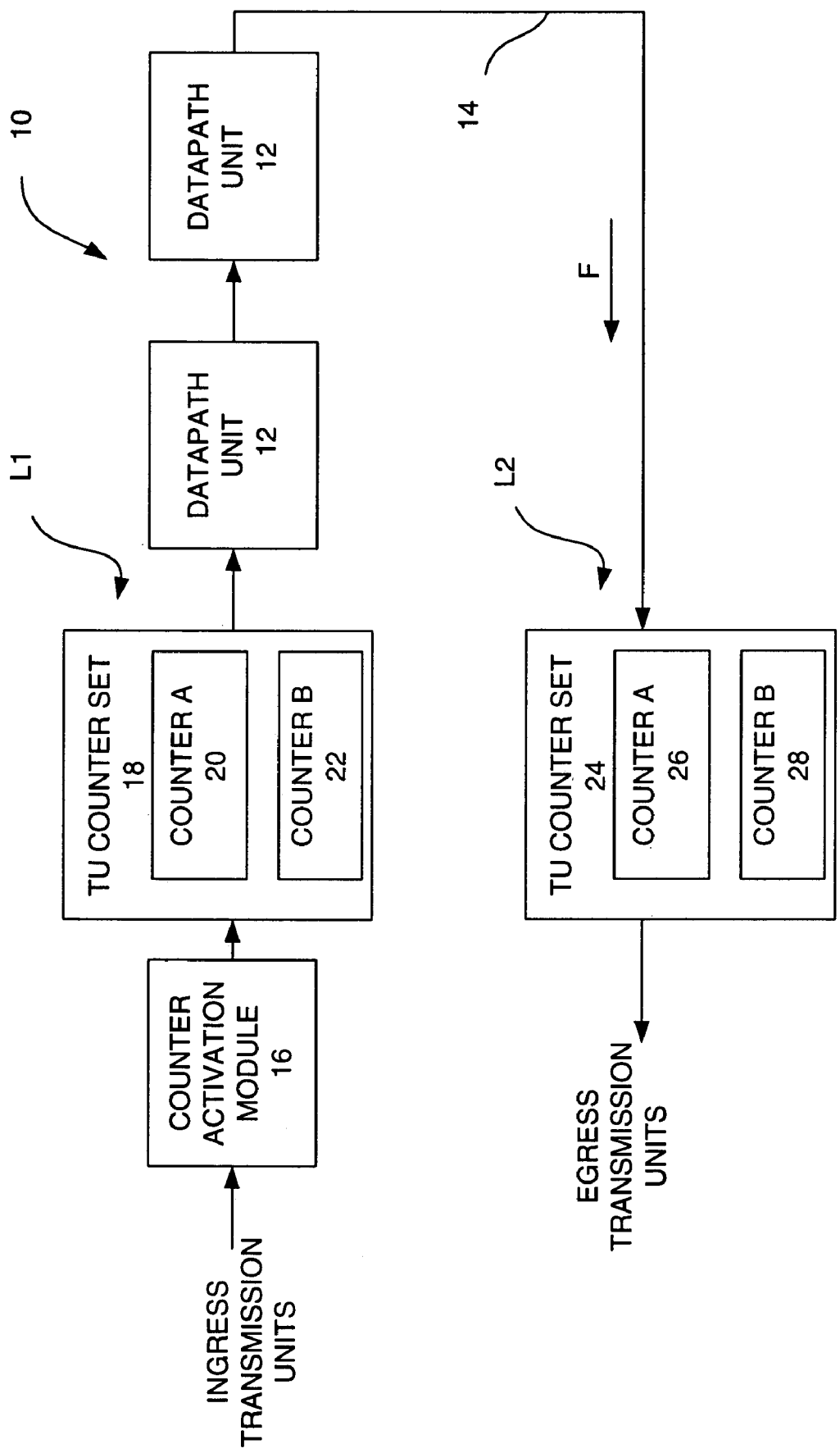
FIG. 1 is a block diagram view depicting a first embodiment of a network system in accordance with the disclosures made herein.

Turning now to the drawing figures, FIG. 1 depicts a network system 10 including a plurality of datapath units 12 coupled in series in a datapath 14. The datapath 14 and the term 'datapath' referred to elsewhere herein refer to a transmission path over which transmission units travel between two or more adjacent transmission unit counter sets. A field replaceable unit (FRU) is an example of the datapath unit 12.

An FRU may include any unit of a system that is readily replaceable, for example, replaceable without having to replace a larger portion of the system or return a larger portion of the system to a vendor or manufacturer for service or replacement. Although the network system 10 is depicted in FIG. 1 to include two datapath units 12, it is contemplated herein that the network system 10 may include more then 2 datapath units 12 or only one datapath unit 12.

A counter activation module 16 and a first transmission unit counter set 18 are coupled in the datapath 14 at a first counting location L1 of the datapath 14. The first transmission counter set 18 is coupled between the plurality of datapath units 12 and the counter activation module 16. The first transmission unit counter set 18 includes a first counter 20 and a second counter 22. A second transmission unit counter set 24 is coupled at a second counting location L2 of the datapath. The second transmission unit counter set 24 includes a first counter 26 and a second counter 28. Relative to a flow direction F of a stream of transmission units being assessed, the first counting location L1 is upstream of the plurality of datapath units 12 and the second counting location L2 is downstream of the plurality of datapath units 12.

In operation, transmission units are transmitted over the datapath 14 toward the datapath units 12 (i.e., ingress datapath transmission units) via the counter activation module 16. The counter activation module 16 dictates which counter of each one of the first and the second transmission unit counter sets (18, 24) is actively counting the transmission units which are emitted by the counter activation module (16) during a given period of time. The intent is to determine a count difference between the number of ingress transmission units and the number of transmission units exiting the datapath 14 (i.e., egress datapath transmission units) at the second counting location L2 that are counted during given counting and settling intervals.

The terms ingress datapath transmission units and egress datapath transmission units refer to transmission units transmitted over a datapath between two or more adjacent transmission unit counter sets rather than transmission units entering and exiting a datapath at a particular counting location. Accordingly, a transmission unit count made at an upstream transmission unit counter set is sometimes referred to herein as an ingress datapath transmission unit count and a transmission unit count made at a downstream transmission unit counter set is sometimes referred to herein as an egress datapath transmission unit count.

Figure 2:
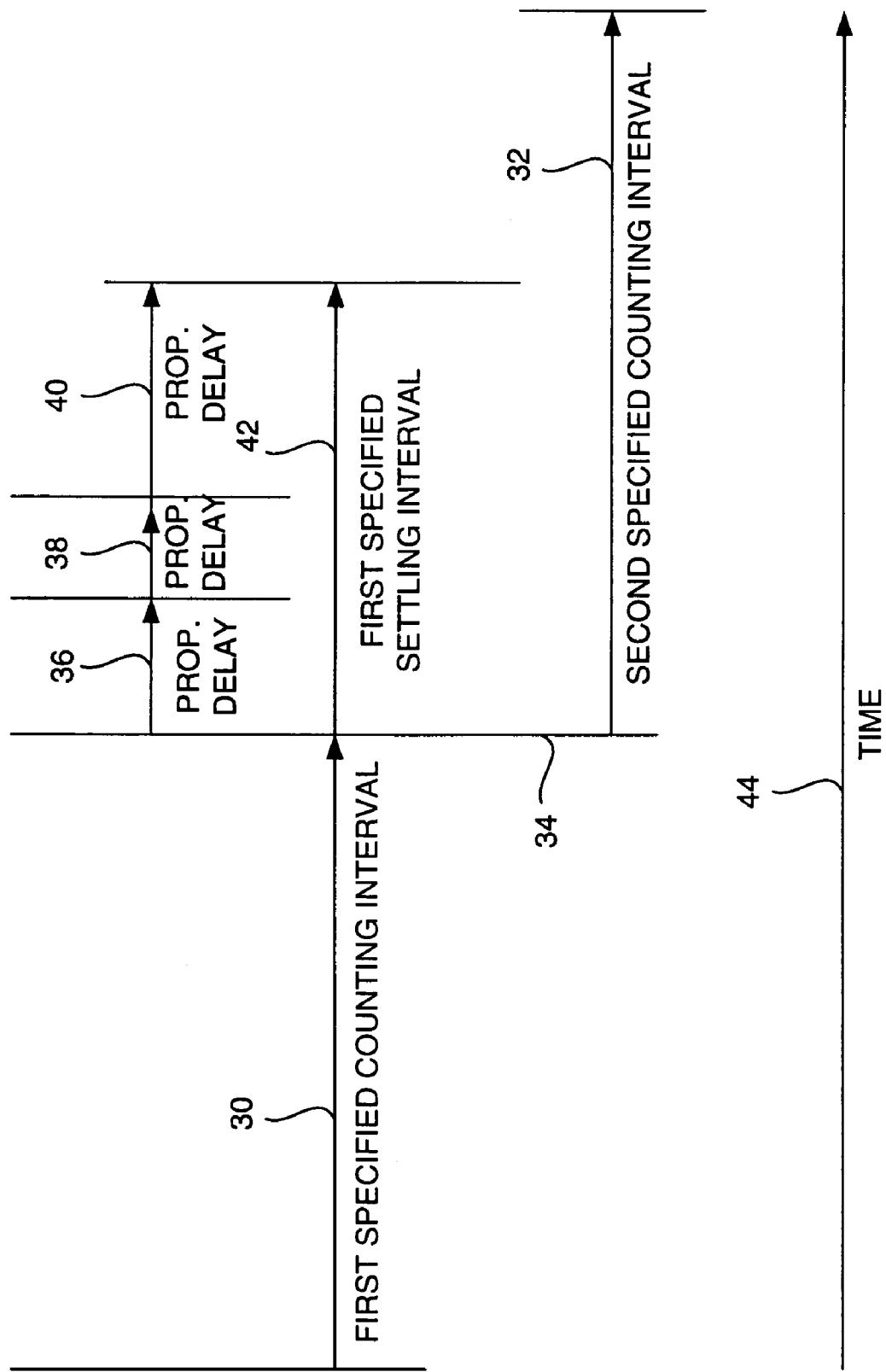
FIG. 2 is a timeline view depicting various intervals of time in accordance with embodiments of the disclosures made herein.

As discussed below in greater detail, the counter activation module 16 may function to designate (e.g., tag) transmission units in a particular manner such that a corresponding one of the counters of each transmission unit counter set (18, 24) counts only the designated transmission units or to issue an activation (e.g., trigger) transmission unit that activates a corresponding one of the counters of each transmission unit counter set. Accordingly, the first counters (20, 26) of each of the first and the second transmission unit counter sets (18, 24, respectively) both actively count transmission units emitted by the counter activation module (16) during a first specified counting interval 30 (FIG. 2). Similarly, the second counter (22, 28) of each the first and the second transmission unit counter sets (18, 24, respectively) both actively count transmission units emitted by the counter activation module (16) during a second specified counting interval 32 (FIG. 2). As shown in FIG. 2, the second specified counting interval 32 follows the first specified counting interval 30.

It should be understood and is contemplated herein that the first counter (20, 26) of the first and the second transmission unit counter sets (18, 24, respectively) may continue counting even after the respective specified counting interval elapses. Referring to FIG. 2, intervals of time are illustrated with respect to time axis 44. The first counters of each of the plurality of transmission unit counter sets (18, 24) are actively counting transmission units emitted by the counter activation module (16) during the first specified counting interval 30. At a first specified settling interval initiation point 34, the first specified counting interval 30 elapses and the second specified counting interval 32 begins. In other embodiments (not shown), there is a delay between the first specified counting interval elapsing and the second specified counting interval being initiated.

However, a plurality of propagation delays (36, 38, 40) exists in association with transmission of transmission units from the first transmission unit counting set 18 through the plurality of datapath units 12 to the second transmission unit counting set 24. Accordingly, a first specified settling interval 42 may be initiated jointly with the second specified counting interval 32. The duration of the first specified settling interval 42 is equal to or greater than the sum of the plurality of propagation delays (36, 38, 40). Effectively, time must be provided for the last transmission unit of the first specified counting interval 30 to be received and counted at the second transmission unit counter set (24). The magnitude of a total propagation delay (i.e., the sum of the plurality of propagation delays (36, 38, 40)) may be dependent upon a duration of time during which transmission units are transmitted via the datapath and/or a temporal alignment of said transmission units being transmitted via the datapath. For example, the latency of one or more datapath units may change as a function of a temporal alignment of the transmission units passing through it, thereby affecting the total propagation delay.

The extent of any overlap of first specified settling interval 42 with second specified counting interval 32 is a function of the durations of propagation delays 36, 38, and 40, as well as the scheduling of the beginning of the second specified counting interval 32 relative to the end of first specified counting interval 30. For example, if the second specified counting interval 32 begins at the beginning of first specified settling interval 42, then the first specified settling interval 42 will overlap entirely with a beginning portion of the second specified counting interval 32. As another example, if the second specified counting interval 32 begins after the beginning of the first specified settling interval 42, the amount of overlap may be reduced.

A second specified settling interval (not shown) is associated with the second specified counting interval 32 in a similar manner as the first specified settling interval 42 is associated with the first specified counting interval 30.

An advantage of the use of a plurality of counters in each one of the transmission unit counter sets (18, 24) is that fault detection may be facilitated in a substantially continuous manner. For example, a first transmission unit settling process being facilitated during a first specified settling interval by the first counter of each of the first and the second transmission unit counter sets (18, 24) is able to proceed to a point of completion, in view of finite propagation delays, while a second transmission unit counting process is being facilitated by the second counter of each of the first and the second transmission unit counter sets (18, 24). Such is the case when the first specified settling interval 42 overlaps with the second specified counting interval. In this manner, transmission units associated with the second specified counting interval 32 may continue to be counted by the second counter (22, 28) of the first and second transmission unit counter sets (18, 24) even though a first transmission unit settling process facilitated by the first counter (20, 26) of each of the first and the second transmission unit counter sets (18, 24) has been initiated.

Figure 3:
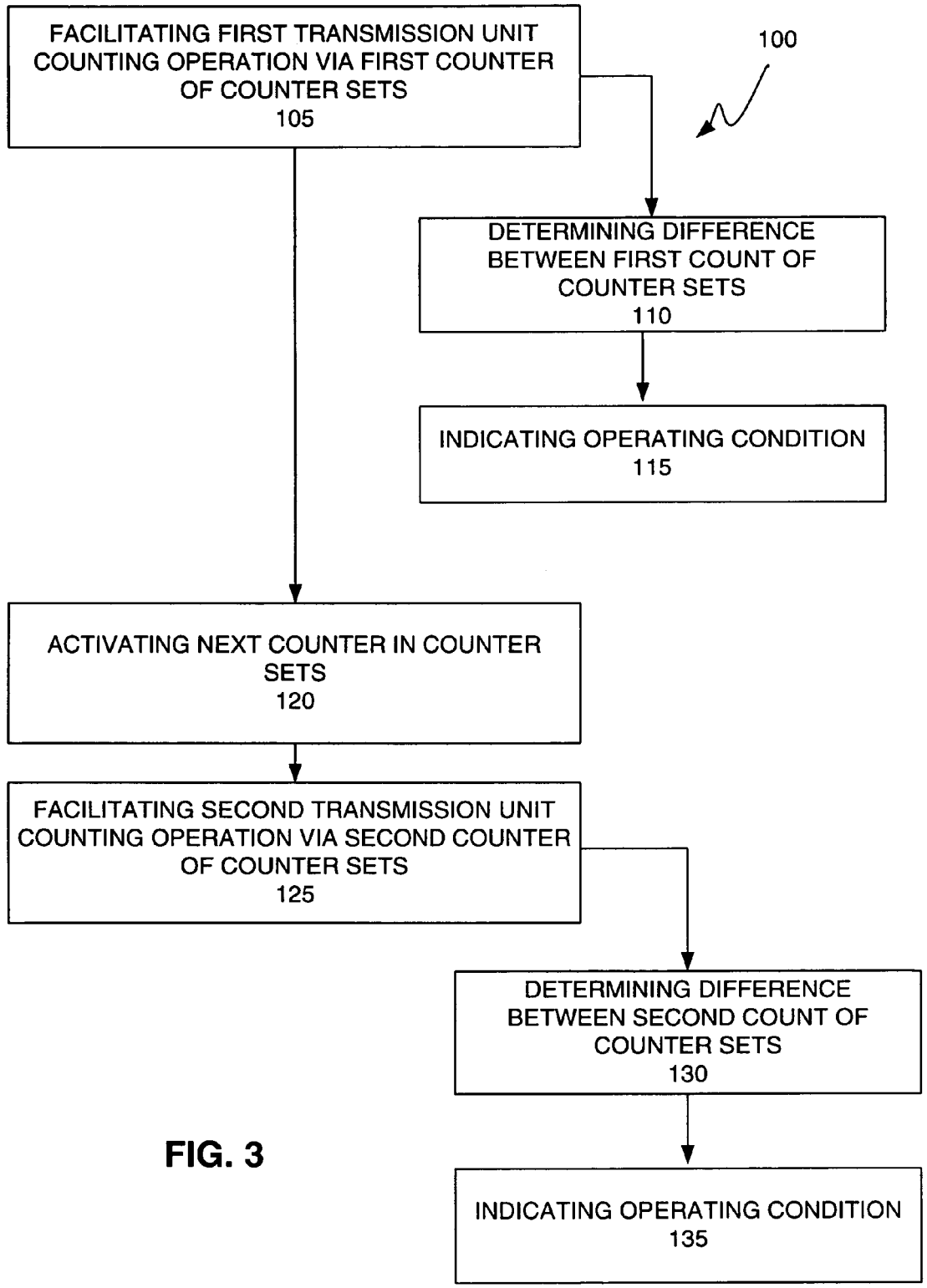
FIG. 3 is a flow chart view, depicting a method of facilitating fault detection in accordance with embodiments of the disclosures made herein.

FIG. 3 depicts a method 100 of facilitating fault detection in accordance with embodiments of the disclosures made herein. The method 100 is capable of being carried out via systems in accordance with embodiments of the disclosures made herein. The method 100 includes a first counting process 105 for facilitating a counting operation of first transmission units (i.e., transmission units which are emitted by the counter activation module (16) during the first specified counting interval (30)) at a first counter of each one of a plurality of transmission unit counter sets. The plurality of transmission unit counter sets is distributed between two adjacent counting locations of the datapath. Each of these counting operations returns a respective first datapath transmission unit count associated with a corresponding one of the counting locations. Specifically, a counter at an upstream counter location would return an ingress datapath count and a counter at a downstream counter location would return an egress datapath count. The first specified counting interval is defined herein as a duration of time in which the counter activation module (16) emits transmission units which are then counted by the first counter of each one of the plurality of transmission unit counter sets (i.e., counting for determining the respective first datapath transmission unit count).

An operation 110 is performed for determining a difference between the first transmission unit counts of the adjacent counting locations. In response to performing the operation for determining a difference between the first transmission unit count of the adjacent counting locations, an operation 115 is performed for indicating an operating condition corresponding to the first transmission unit counting process. Examples of the operating condition include a fault condition when transmission unit counts are not equal and a proper operating condition when transmission unit counts are equal.

After the first specified counting interval elapses, an operation 120 is performed for activating a next counter in each of the transmission unit counter sets (e.g., the second counter). In response to activating the next counter in each of the transmission unit counter sets, a second counting process 125 is performed for facilitating a counting operation of second transmission units (e.g., transmission units which are emitted by the counter activation module (16) during the second specified counting interval (34)) at a second counter of each one of a plurality of transmission unit counter sets during a second specified counting interval. Each second transmission unit counting operation returns a respective second transmission unit count. An operation 130 is performed for determining a difference between the second transmission unit counts of the adjacent counting locations. In response to performing the operation for determining the difference between the second transmission unit counts of the adjacent counting locations, an operation 135 is performed for indicating an operating condition corresponding to the second transmission unit counting process.

It should be understood and is contemplated herein that there may be one or more localized ingress points and one or more localized egress points at a given counting location. For example, transmission units may be entering and leaving the data stream within a datapath. Accordingly, the difference between transmission unit counts on either side of the datapath may be the difference between the number of transmission units entering the datapath and exiting the datapath. To prevent this condition from masking true fault conditions, those transmission units which intentionally enter or exit the data stream within a datapath may be counted and taken into consideration when indicating the operating condition in operation 135.

Figure 4:
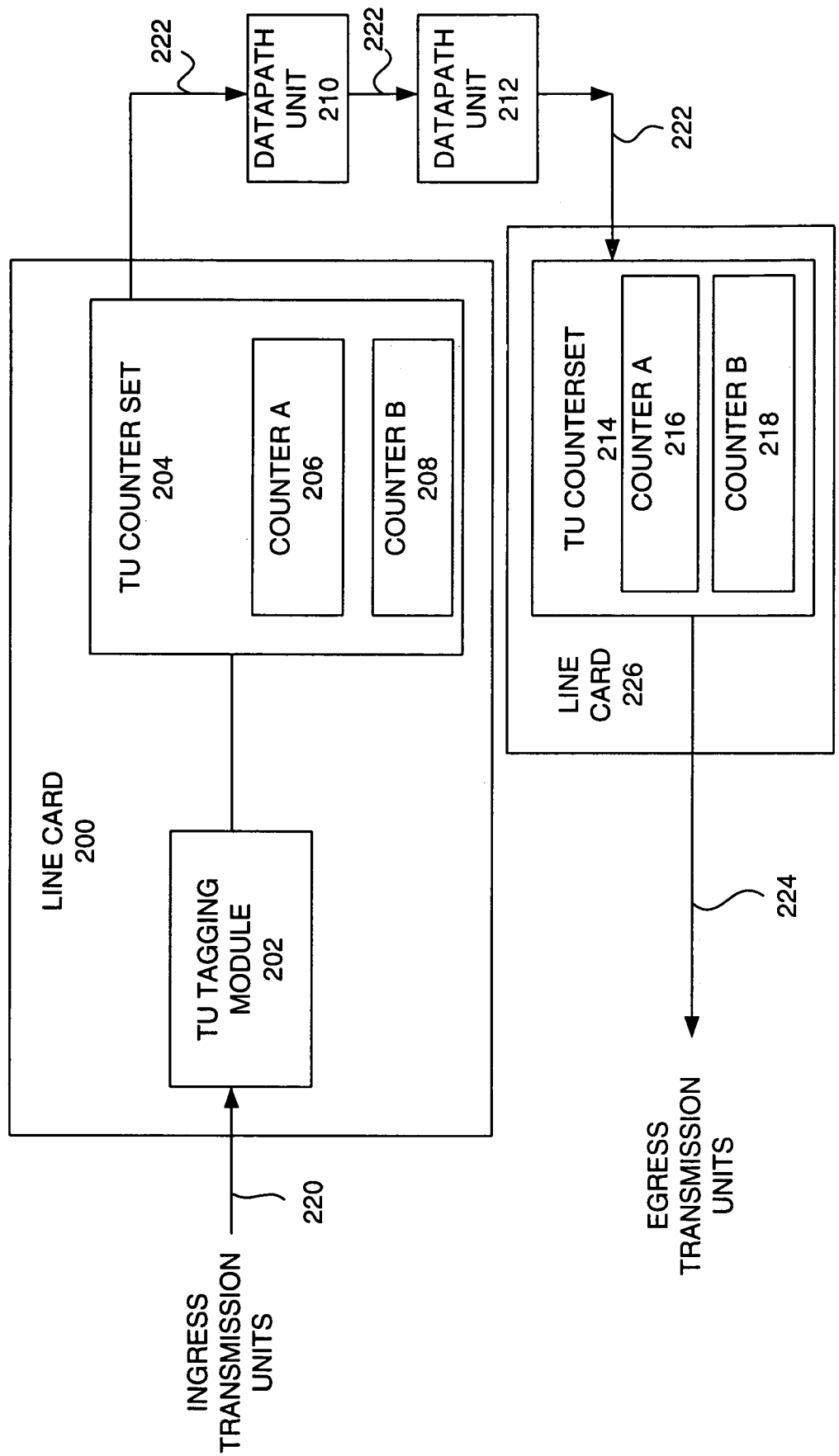
FIG. 4 is a block diagram view depicting an embodiment of a line card capable of tagging transmission units.
Figure 5:
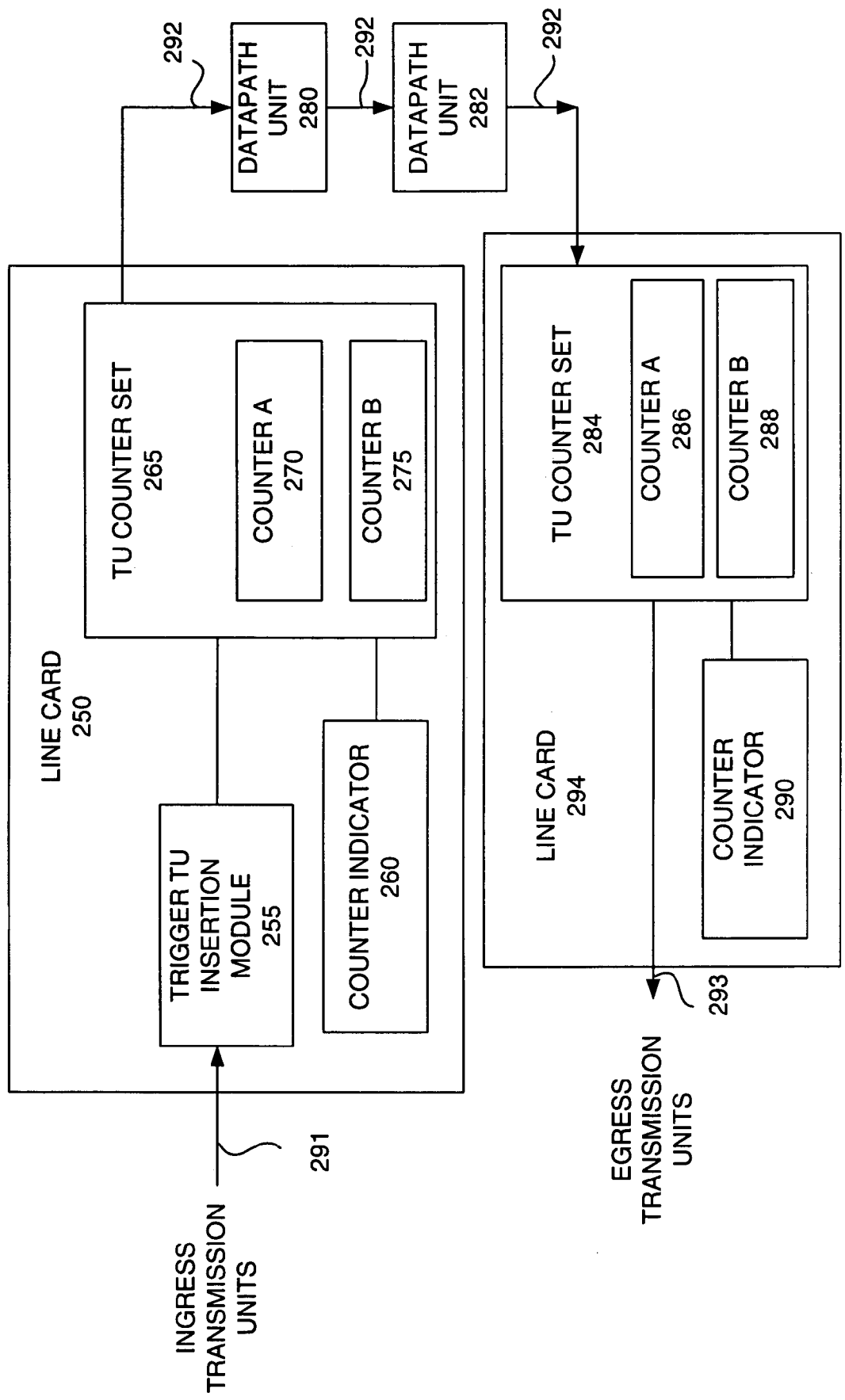
FIG. 5 is a block diagram view depicting an embodiment of a line card capable of inserting a trigger transmission unit in a stream of transmission units.

As discussed above briefly in reference to FIG. 1, a counter activation module (e.g., the counter activation module 16) may function to designate (e.g., tag) transmission units in a particular manner such that a corresponding counter of a transmission unit counter set counts only the designated transmission units, or to issue an activation (e.g., trigger) transmission unit that activates a corresponding counter of a transmission unit counter set. Depicted in FIG. 4 is a line card 200 capable of tagging transmission units. Depicted in FIG. 5 is a line card 250 capable of inserting a trigger transmission unit in a stream of transmission units. Note that the depiction of certain elements of FIG. 4 as being within line card 200 or line card 226 or of certain elements of FIG. 5 as being within line card 250 or line card 294 is intended to be exemplary. Such elements need not be within such line cards and/or other elements may be included within such line cards. In fact, line cards are not a required element, and some embodiments of the invention may be practiced without line cards. Other configurations are also possible, for example, in some embodiments, some or all of the elements depicted as being in line cards 200 and 226 may be included within the same line card or some or all of the elements depicted as being in line cards 250 and 294 may be included within the same line card.

The line card 200 depicted in FIG. 4 includes a transmission unit tagging module 202 and a transmission unit (TU) counter set 204 coupled to the transmission unit tagging module 202. The transmission unit counter set 204 includes a first counter 206 and a second counter 208. In operation, a line card 200 is coupled in a datapath 222 at an upstream counting location and a line card 226 is coupled in the datapath 222 at a downstream counting location. The line card 200 at the upstream counting location receives ingress transmission units at input 220. The line card 226 at the downstream counting location provides egress transmission units at output 224. Datapath units 210 and 212 are coupled in datapath 222 between line card 200 and line card 226. Line card 226 comprises TU counter set 214, which comprises counter A 216 and counter B 218. Being downstream, line card 226 need not include a TU tagging module although it may include one that merely allows transmission units tagged by TU tagging module 202 to pass. The transmission unit tagging module 202 of the line card 200 at the upstream counting location facilitates tagging transmission units received at input 220 as Type A transmission units (i.e., first designated transmission units) during a first specified counting interval. Accordingly, the first counter 206 of the line card 200 at the upstream counting location and the first counter 216 of the line card 226 at the downstream counting position count Type A transmission units when processing transmission units tagged by the upstream tagging module 202 during the first specified counting interval. An embodiment of tagging includes setting at least one bit of each transmission unit to a first prescribed setting. The at least one bit is preferably located similarly within each one of the transmission units.

After the first specified counting interval elapses, the transmission unit tagging module discontinues tagging transmission units as Type A transmission units and begins tagging the transmission units as Type B transmission units. Thus, the second counter 208 of the line card 200 at the upstream counting location and the second counter 218 of the line card 226 at the downstream counting position count Type B transmission units when processing transmission units tagged by the upstream tagging module 202 during the second specified counting interval. In this manner, counting of Type A transmission units is allowed to settle in view of propagation delay during a first specified settling interval, followed by a comparison of a transmission unit count of Type A transmission units made by the first counter 206 of the line card 200 at the upstream position and a transmission unit count of Type A transmission units made by the first counter 216 of the line card 226 at the downstream counting location.

The line card 250 depicted in FIG. 5 comprises a trigger transmission unit insertion module 255, an active counter indication module 260 and a transmission unit counter set 265. The transmission unit counter set 265 is coupled to the trigger transmission unit insertion module 255 and to the active counter indication module 260. The transmission unit counter set comprises a first counter 270 and a second counter 275. The counter indicator 260 facilitates indicating which one of the counters (270, 275) of the transmission unit counter set 265 is actively counting the designated transmission units during a particular specified counting interval.

The line card 294 depicted in FIG. 5 comprises a transmission unit counter set 284 and a counter indicator 290. Transmission unit counter set 284 comprises a counter A 286 and a counter B 288. Being downstream, line card 294 may but need not, comprise a trigger TU insertion module.

Figure 6:
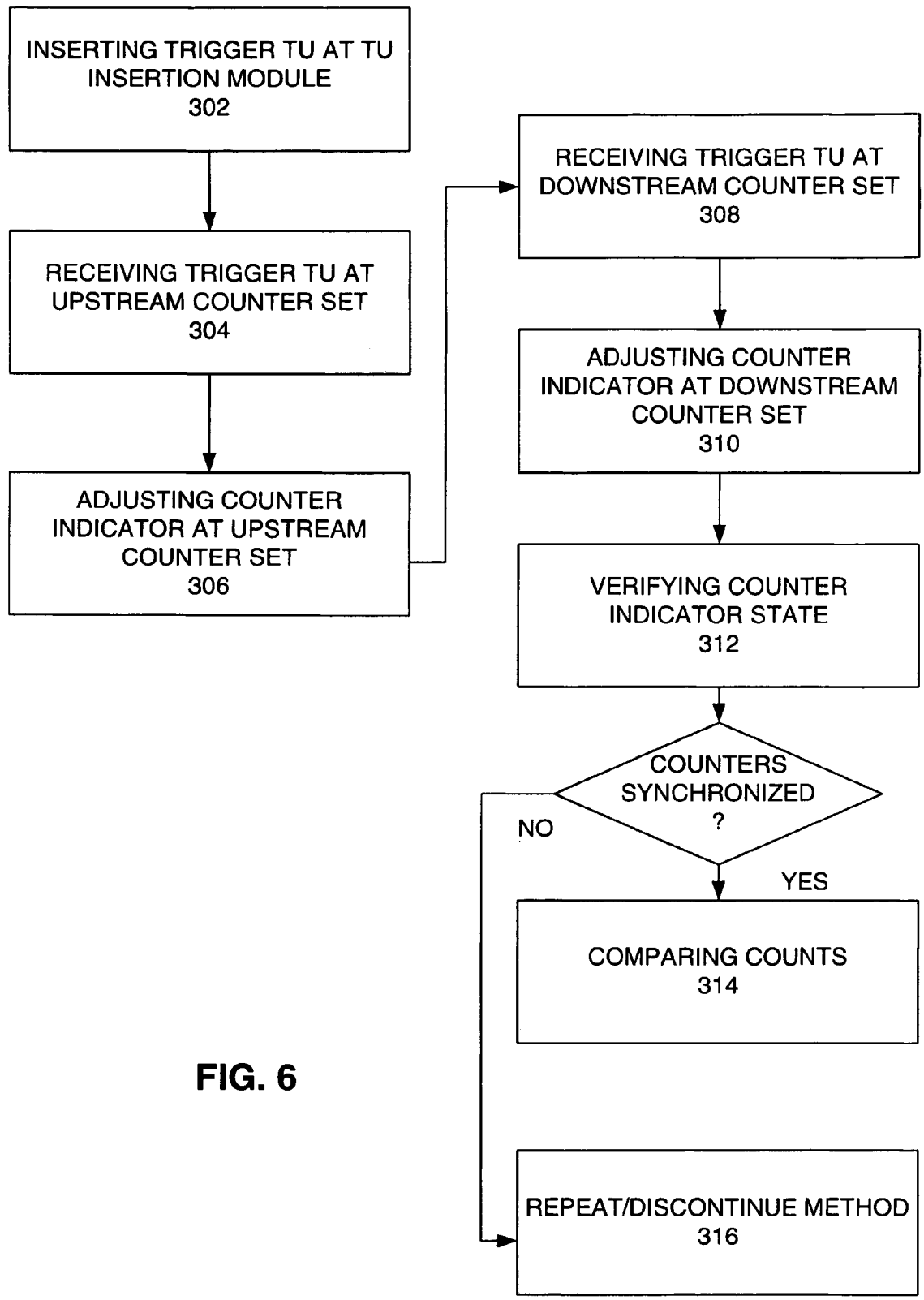
FIG. 6 is a flow diagram view depicting a method 300 for facilitating fault detection via a line card capable of inserting a trigger transmission unit in a stream of transmission units.

In operation, a line card 250 is coupled in a datapath 292 at an upstream counting location and a line card 294 is coupled in the data path 292 at a downstream counting location. Line card 250 receives ingress transmission units at input 291 and outputs transmission units to datapath 292. Line card 294 receives transmission units from datapath 292 and provides egress transmission units at output 293. Datapath units 280 and 282 are in datapath 292 between line card 250 and line card 294. Referring to FIG. 6 and references in FIG. 5, a method 300 for facilitating fault detection comprises an operation 302 for inserting a first trigger transmission unit in a stream of transmission units for initiating a first specified counting interval, performed by the trigger transmission unit insertion module 255 of the line card 250 at the upstream counting location. In response to an operation 304 being successfully performed for receiving the first trigger transmission unit at the first counter 270 of the line card 250 at the upstream counting position, an operation 306 is performed for adjusting the counter indicator 260 to a state indicating that the first counter 270 of the line card 250 at the upstream counting position is actively counting received transmission units and the second counter 275 of the line card 250 at the upstream counting position is not counting received transmission units. Similarly, in response to an operation 308 being successfully performed for receiving the first trigger transmission unit at the first counter 286 of the line card 294 at the downstream counting position, an operation 310 is performed for adjusting the counter indicator 290 at the downstream counting location to a state indicating that the first counter 286 of the line card 294 at the downstream counting position is actively counting received transmission units, and the second counter 288 of the line card 294 at the downstream counting position is not counting received transmission units.

After the first specified counting interval elapses, the trigger transmission unit insertion module 255 performs an operation (not shown) for inserting a second trigger transmission unit in a stream of transmission units for initiating a second specified counting interval after the first specified counting interval elapses. Upon reception of the second trigger transmission unit at transmission unit counter set 265, an operation (not shown) is performed for adjusting the active counter indication module 260 to a second state indicating that the second counter 275 is actively counting received transmission units and the first counter 270 is not counting received transmission units. Similarly, upon reception of the second trigger transmission unit at line card 294, an operation is performed for adjusting the active counter indication module 290 to a second state indicating that the second counter 288 is actively counting received transmission units and the first counter 286 is not counting received transmission units. Corresponding to the changes in state of the active counter indication modules 260 and 290, the second counter 275 of the line card 250 at the upstream counting location and the second counter 288 of the line card 294 at the downstream counting location actively count transmission units and the first counter 270 of the line card 250 at the upstream counting location and the first counter 286 of the line card 294 at the downstream counting location stop counting transmission units.

Prior to comparing the transmission unit count made by the first counter 270 at the upstream counting location with the transmission unit count made by the first counter 286 at the downstream counting location, an operation 312 is performed for verifying that the counter indicator 260 at the upstream counting location is synchronized with the counter indicator 290 at the downstream counting location. In response to the counter indicators 260 and 290 being synchronized (i.e., indicating the second counters 275 and 288 being active), an operation 314 is performed for comparing the transmission unit count made by the first counter 270 at the upstream counting location with the transmission unit count made by the first counter 286 at the downstream counting location, thus enabling a present operating condition to be indicated. Following step 314, the preceding steps may be repeated so as to repeat the method, or the method may be discontinued. In the event that the counter indicators are not synchronized, an operation 316 is performed for repeating or discontinuing the method.

During a first specified settling interval after the first specified counting interval elapses, the first counter 286 of the line card 294 at the downstream counting location continues to count first designated transmission units in view of propagation delay. A series of operations similar to the operations 304 through 316 is performed in association with the transmission unit counts for indicating any fault condition associated therewith.

Figure 7:
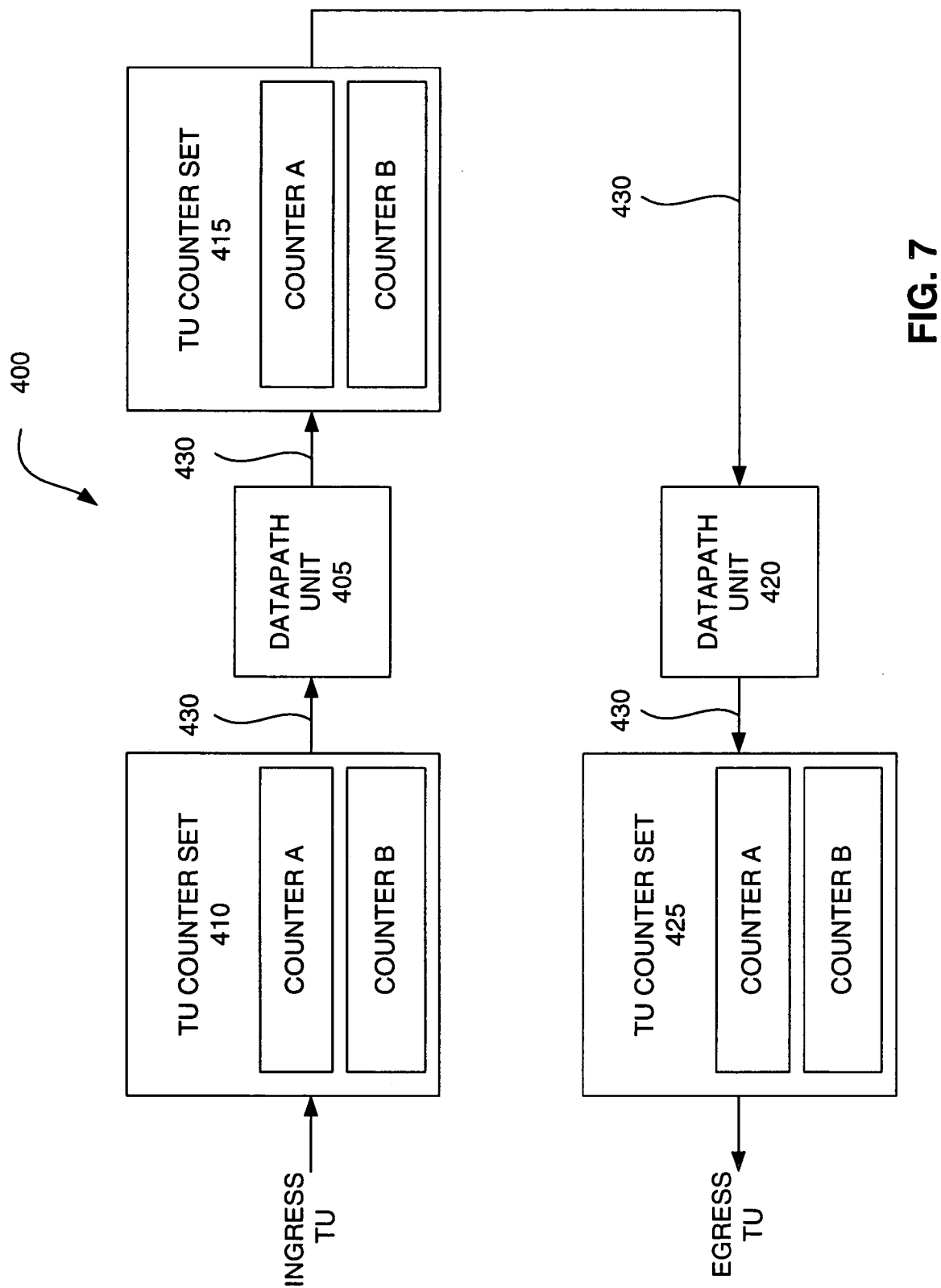
FIG. 7 is a block diagram view depicting an embodiment of a network system having distributed transmission unit counter sets and datapath units.

Referring to FIG. 7, a network system 400 comprises a first datapath unit 405 coupled in a datapath 430 between a first transmission unit counter set 410 and a second transmission unit counter set 415. The network system 400 further comprises a second datapath unit 420 coupled in the datapath 430 between the second transmission unit counter set 415 and a third transmission unit counter set 425. The position of the first transmission unit counter set 410 defines a first counting location, the position of the second transmission unit counter set 415 defines a second counting location and the position of the third transmission unit counter set 425 defines a third counting location.

An arrangement as depicted in FIG. 7 is intended to increase the resolution of fault isolation to a single datapath unit. The operation of the network system 400 is similar to that of the network system 10 depicted in FIG. 1, with the exception that transmission unit counts made at each end of one of the datapath units (405, 420) are compared to each other. In response to difference being identified, the difference indicates that a fault condition exists in a particular datapath unit. Accordingly, when the first and the second datapath units (405, 420) are field replaceable units (FRU), a fault condition may be remedied by replacing the appropriate FRU. In the network system 10 depicted in FIG. 1, a fault condition is not capable of being isolated to a particular one of the plurality of datapath units 12.

At least one method may be performed to provide identification of faulty datapath units more particularly. It should be understood that the ordinal designations of elements described below (i.e., transmission unit counter sets) may differ from other descriptions pertaining to such elements. For example, such a method may comprise a step of performing a first datapath intermediary transmission unit counting operation during a duration consisting of a first specified counting interval 30 and a first specified settling interval 42. That operation may be performed at a first counter of a third transmission unit counter set 415 in a datapath 430 and may serve to determine a first datapath intermediary transmission unit count. In such an example, the third transmission unit counter set 415 is situated between a first transmission unit counter set 410 and a second transmission unit counter set 425 along the datapath 430. Localized identification of a fault in the datapath 430, for example, a faulty datapath unit 405, may be achieved by comparing the first datapath intermediary transmission unit count to the first datapath ingress transmission unit count obtained from the first transmission unit counter set 410 to identify a first fault status pertaining to a first portion of the datapath 430 between the first transmission unit counter set 410 and the third transmission unit counter set 415. As another example, such localized identification of a fault may be achieved by comparing the first datapath egress transmission unit count obtained from the second transmission unit counter set 425 to the first datapath intermediary transmission unit count to identify a second fault status pertaining to a second portion of the datapath 430 between the third transmission unit counter set 415 and the second transmission unit counter set 425. Such a method may be used to divide a datapath into as many segments as desired to obtain any level of granularity of localized identification of faults as may be desired. Likewise, the network system 400 of FIG. 7 may be practiced with as many instances of transmission unit counter set 415 inserted in datapath 430 as may be desired and may include any number of datapath units, such as datapath units 405 and 420.

Figure 8:
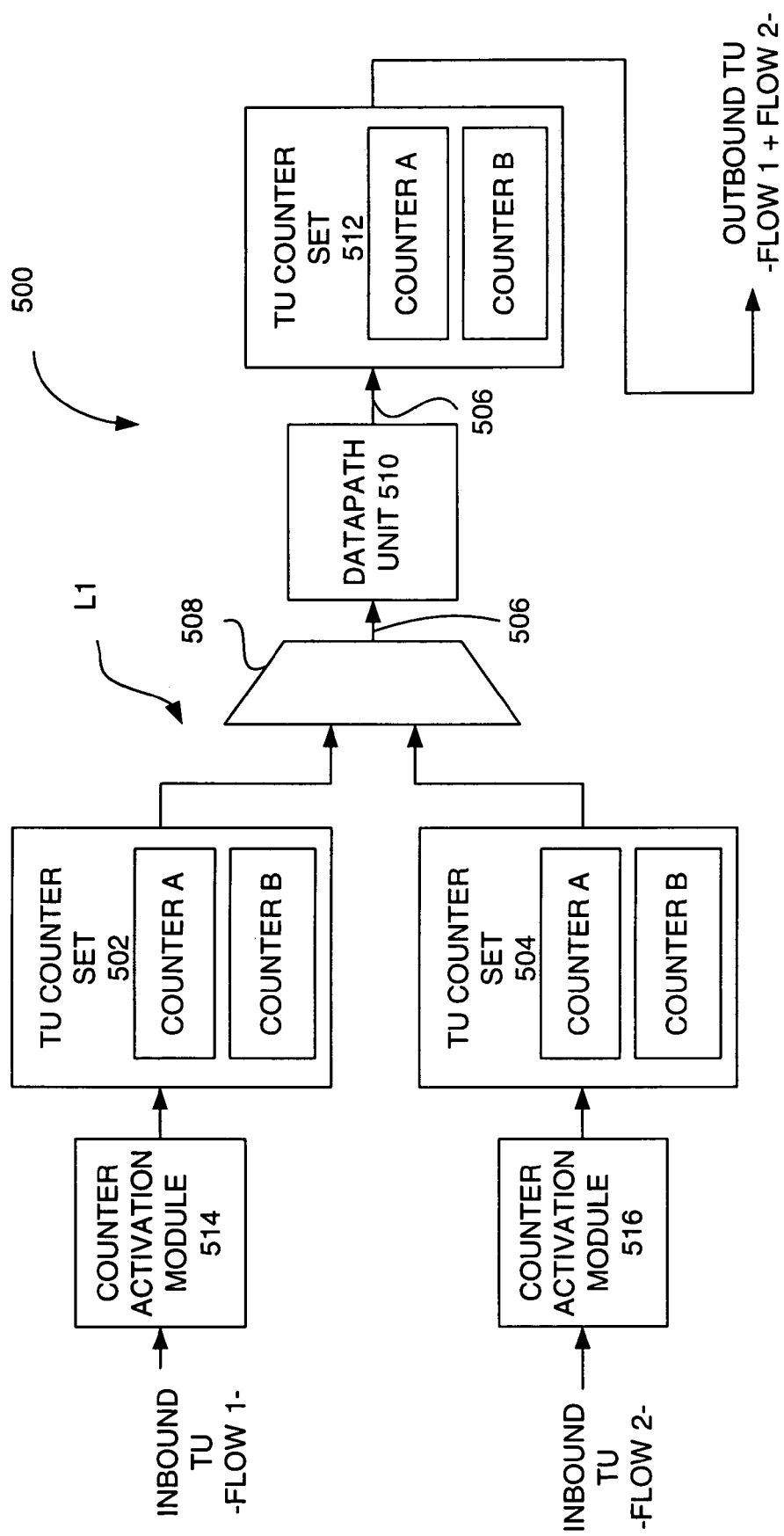
FIG. 8 is a block diagram depicting an embodiment of a network system having multiplexed ingress streams of transmission units.

Referring to FIG. 8, a network system 500 includes a first transmission unit counter set 502 and a second transmission unit counter set 504 coupled in parallel in a datapath 506 via a multiplexing module 508. A datapath unit 510 is coupled between the multiplexing module 508 and a third transmission unit counter set 512. The first transmission unit counter set 502 facilitates a transmission unit count for a first stream of ingress transmission units (i.e., flow 1) and the second transmission unit counter set 504 facilitates a transmission unit count for a second stream of ingress transmission units (i.e., flow 2). The multiplexing module 508 multiplexes the flow (i.e., flow 1) associated with the first transmission unit counter set 502 and the flow (i.e., flow 2) associated with the second transmission unit counter set. The third transmission unit counter set 512 facilitates a transmission unit count for the combined flow (i.e., flow 1+flow 2) of the first and the second transmission unit counter sets (502, 504, respectively). It is contemplated herein that additional transmission unit counter sets and datapath units may be utilized in the network system 500 in a similar manner as depicted in FIG. 7 for improving fault isolation capabilities.

In operation, a first counter activation module 514 (e.g., a first cell tagging device) is coupled to the first transmission unit counting set 502 and a second counter activation module 516 (e.g., a second cell tagging device) is coupled to the second transmission unit counting set 504. The first and the second counter activation modules (514, 516) operate in unison to determine which one of a plurality of counters at each of the transmission unit counter sets (502, 504, 512) are actively counting designated transmission units. It should be understood that the first and the second counter activation modules (514, 516) need not be synchronized precisely with each other.

At least one method may be performed in a network system comprising multiple ingress paths. For example, a method may be practiced wherein determining the first datapath ingress transmission unit count is further performed at a third counting location, such as a counting location along a path carrying a flow of data to be merged into the datapath, and is further facilitated by a first counter of a transmission unit counter set at the third counting location. In such a case, the first datapath ingress transmission unit count may be obtained based on counts performed by multiple counters at different locations counting ingress transmission units.

Figure 9:
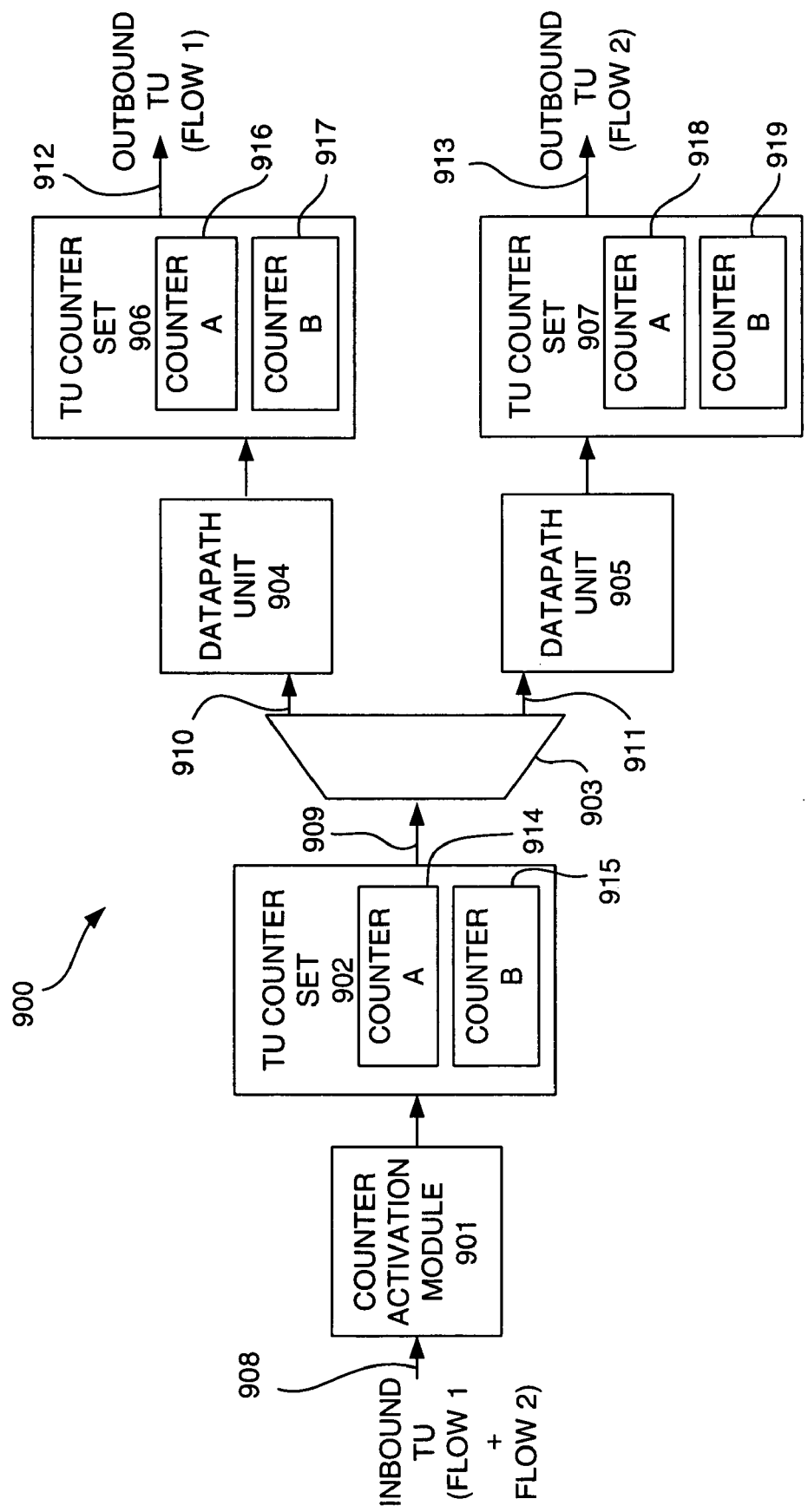
FIG. 9 is a block diagram illustrating a network system 900 in accordance with at least one embodiment of the present invention.

FIG. 9 is a block diagram illustrating a network system 900 in accordance with at least one embodiment of the present invention. Network system 900 comprises a counter activation module 901, a transmission unit counter set 902, a splitter 903, datapath units 904 and 905, and transmission unit counter sets 906 and 907. Inbound transmission unit flow 908, which comprises a first flow and a second flow, is provided to counter activation module 901 and passes to transmission unit counter set 902. Transmission unit counter set 902 comprises a counter A 914 and a counter B 915. The transmission unit flow 909 continues to splitter 903, which splits the transmission unit flow 909 into the first flow 910 and the second flow 911.

The first flow 910 is provided to datapath unit 904 and continues to transmission unit counter set 906. The second flow 911 is provided to datapath unit 905 and continues to transmission unit counter set 907. Transmission unit counter set 906 comprises a counter A 916 and a counter B 917. Transmission unit counter set 907 comprises a counter A 918 and a counter B 919. Transmission unit counter set 906 provides a first outbound flow 912. Transmission unit counter set 907 provides a second outbound flow 913.

Counter activation module 901, which may be co-located with transmission unit counter set 902 or may be present anywhere upstream of transmission unit counter set 902, provides an indication of transmission units being designated to be counted by a correspondingly designated counter of transmission unit counter sets, such as transmission unit counter sets 902, 906, and 907. For example, counter activation module may provide an indication of transmission units being designated to be counted by the counters A or counters B of transmission unit counter sets 902, 906, and 907. As an example, counter activation module 901 may tag transmission units with such an indication, which may, for example, take the form of marking at least one bit within or in proximity to a transmission unit with a value and, as a more particular example, with such at least one bit having a similar position relative to the transmission unit for each such indication provided. As another example, counter activation module 901 may provide at least one trigger indication among the transmission units to indicate a transition from designation of transmission units to be counted by one counter to designation of transmission units to be counted by another counter of transmission unit counter sets.

Splitter 903 may route transmission units among first flow 910 and second flow 911 according to some criteria such that a transmission unit may be routed to first flow 910 but not second flow 911 or to second flow 911 but not first flow 910, or splitter 903 may provide all transmission units of transmission unit flow 909 to both of first flow 910 and second flow 911. Optionally, splitter 903 may receive more than one inbound flow. In such a case, each inbound flow is preferably provided with its own transmission unit counter set. Optionally, splitter 903 may provide more than two outbound flows. In such a case, each outbound flow is preferably provided with its own transmission unit counter set.

While datapath units 904 and 905 are illustrated as being located between splitter 903 and transmission unit counter sets 906 and 907, it should be understood that one or more datapath units may be located between transmission unit counter set 902 and splitter 903. For example, one or more datapath units may be located between transmission unit counter set 902 and splitter 903 in addition to datapath units 904 and 905 or in substitution of either or both of datapath units 904 and 905. Moreover, additional datapath units may be provided between splitter 903 and either or both of transmission unit counter sets 906 and 907. Optionally, one or more transmission unit counter sets and/or one or more datapath units may be integrated into splitter 903 in addition to or in substitution of any other transmission unit counter sets and/or datapath units in the system.

At least one method may be practiced in a network system in which a datapath is split into multiple flows of data. For example, a method may be practiced by performing a first datapath second egress (i.e., first transmission units at a second egress path) transmission unit counting operation during the first specified counting interval 30 and during the first specified settling interval 42 at a first counter 918 of a third transmission unit counter set 907 in the datapath, wherein a first datapath second egress transmission unit count is determined, the third transmission unit counter set 907 being situated along a path 911 branching from the datapath 909 between the first transmission unit counter set 902 and the second transmission unit counter set 906. Such a method may be practiced wherein identical transmission units are provided to the second transmission unit counter set 906 and the third transmission unit counter set 907 and wherein indicating a fault condition associated with the first specified counting interval 30 alternatively occurs when a difference is determined between the first datapath ingress transmission unit count and the first datapath second egress transmission unit count after the first specified settling interval 42 elapses, as well as when a difference is determined between the first datapath ingress transmission unit count and the first datapath egress transmission unit count after the first specified settling interval 42 elapses.

Another example of a method may be performed when a datapath is split into two mutually exclusive flows of data. Such a method may be practiced wherein performing a first datapath egress transmission unit counting operation is further performed at a first counter of a third transmission unit counter set, the third transmission unit counter set being situated along a path branching from the datapath between the first transmission unit counter set and the second transmission unit counter set, wherein the first datapath egress transmission unit count is further determined according to a sum of a first portion of transmission units counted at the first transmission unit counter set and a second portion of transmission units counted at the third transmission unit counter set.

As yet another example, a method may be practiced wherein determining the first datapath egress transmission unit count is further performed at a third counting location, such as a counting location along a path branching from a datapath and is further facilitated by a first counter of a transmission unit counter set at the third counting location. In such a case, the first datapath egress transmission unit count may be obtained based on counts performed by multiple counters at different locations counting egress transmission units.

Referring now to data processor programs in accordance with at least an embodiment of the disclosures made herein, a data processor program controls at least a portion of the methods, processes, and/or operations associated with facilitating fault detection in a datapath of a network system. Accordingly, the data processor program controls at least a portion of the operations necessary to facilitate fault detection in a manner consistent with the disclosures made herein. The term data processor program is defined herein to refer to computer software, data processor algorithms, or any other type of instruction code capable of controlling operations associated with a data processor. A microprocessor, microcontroller, microcomputer, digital signal processor, state machine, logic circuitry, and/or any device that manipulates digital information based on operational instruction or in a predefined manner are examples of a data processor.

A data processor program in accordance with an embodiment of the disclosures made herein is processable by a data processor of an active and/or inactive routing module of a network element. A copy of the data processor program may be resident on each of the routing elements in a network element. Furthermore, each copy of the data processor program may be accessible by a data processor of the respective routing module from a memory apparatus of the respective routing module (e.g., RAM, ROM, virtual memory, hard drive memory, etc.) or from a peripheral apparatus such as a diskette, a compact disk, an external data storage device, or the like.

A data processor program accessible from an apparatus by a data processor is defined herein as a data processor program product. It is contemplated herein that the data processor program product may comprise more than one data processor program each accessible from respective apparatuses. It is further contemplated herein that each one of a plurality of data processor programs may be accessed by a different respective one of a plurality of data processors. For example, a first data processor and a second data processor (e.g., of a leaf node and a root note), respectively, may access a first data processor program and a second data processor program, respectively, from a first apparatus and a second apparatus (e.g., a first memory device and a second memory device), respectively.

In embodiments having, for example, a first counter and a second counter of a transmission unit counter set and designating transmission units to be counted by such counters, the system may be configured to designate a first number of transmission units or transmission units emitted during a first period of time to be counted by the first counter and a second number of transmission units or transmission units emitted during a second period of time to be counted by the second counter. Such a process may be terminated after some amount of time or continued indefinitely, for example, by continuing to alternate between counting using the first counter and counting using the second counter.

In embodiments having more than two counters in a transmission unit counter set, the system may be configured to designate a first number of transmission units or transmission units emitted into the system during a first period of time to be counted by the first counter and subsequent numbers of transmission units or transmission units emitted into the system during subsequent periods of time to be counted by counters other than the first counter in any pattern or sequence. Such a process may be terminated after some amount of time or continued indefinitely, for example, by changing counters after all transmission units emitted into the system during each period of time have passed such counters. Regardless of the numbers of counters provided, the numbers of transmission units designated to be counted by each counter may be similar or different and/or the durations of periods of time during which transmission units are designated to be counted by respective counters may be similar or different.

While certain terms connoting ordinal relationships, such as first or second, have been used in the foregoing description, use of similar ordinal terms in the claims shall not be construed to establish a correspondence with like ordinal terms in the foregoing description. For example, an element in the claims referred to as being "first" may, in some embodiments, relate to an element described in the foregoing description as "first" and, in some other embodiments, to an element described in the foregoing description as "second."

In the preceding detailed description, reference has been made to the accompanying drawings that form a part hereof, and in which are shown by way of illustration specific embodiments in which the invention may be practiced. These embodiments have been described in sufficient detail to enable those skilled in the art to practice the invention, and it is to be understood that other embodiments may be utilized and that logical, mechanical, chemical and electrical changes may be made without departing from the spirit or scope of the invention. Modules are defined herein to include hardware, software and/or firmware components. Hardware, software and/or firmware for one module may jointly and/or individually comprise respective and appropriate portions all or part of hardware, software, and/or firmware of one or more other modules. To avoid detail not necessary to enable those skilled in the art to practice the invention, the description omits certain information known to those of skill in the art. The preceding detailed description is, therefore, not to be taken in a limiting sense, and the scope of the present invention is defined only by the appended claims.

What is claimed is:

1. A method of detecting a transmission unit fault condition, comprising:
    performing a first datapath ingress transmission unit counting operation during a first duration consisting of a first specified counting interval and a first specified settling interval after the first specified counting interval elapses at a first counter of a first transmission unit counter set in a datapath, wherein a first datapath ingress transmission unit count is determined;
    performing a first datapath egress transmission unit counting operation during the first specified counting interval and during the first duration at a first counter of a second transmission unit counter set in the datapath, wherein a first datapath egress transmission unit count is determined; and
    indicating a fault condition associated with the first specified counting interval when a difference is determined between the first datapath ingress transmission unit count and the first datapath egress transmission unit count after the first specified settling interval elapses.

2. The method of claim 1 wherein the first specified counting interval and the first specified settling interval are each respective prescribed intervals of time.

3. The method of claim 1 wherein the first specified settling interval is dependent upon a propagation delay through the datapath between the first counter of the first transmission unit counter set and the first counter of the second transmission unit counter set.

4. The method of claim 1, further comprising:
    inserting a first trigger transmission unit upstream of the first transmission unit counter set for activating the first counter of the first transmission unit counter set and the first counter of the second transmission unit counter set during the first specified counting interval; and
    confirming that the first trigger transmission unit is received by the first transmission unit counter set and by the second transmission unit counter set prior to indicating the fault condition associated with the first specified counting interval.

5. The method of claim 4, further comprising:
    adjusting a counter indicator associated with the first transmission unit counter set to a state indicating the first counter of the first transmission unit counter set is active in response to the first trigger transmission unit being received by the first transmission unit counter set;
    adjusting a counter indicator associated with the second transmission unit counter set to a state indicating the first counter of the second transmission unit counter set is active in response to the first trigger transmission unit being received by the second transmission unit counter set; and
    wherein confirming includes checking the states of the counter indicator associated with the first transmission unit counter set and the counter indicator associated with the second transmission unit counter set prior to indicating the fault condition associated with the first specified counting interval.

6. The method of claim 1, further comprising:
    inserting a first trigger transmission unit upstream of the first transmission unit counter set for activating the first counter of the first transmission unit counter set and the first counter of the second transmission unit counter set during the first specified counting interval
    inserting a second trigger transmission unit upstream of the first transmission unit counter set for activating a second counter of the first transmission unit counter set and a second counter of the second transmission unit counter set during a second specified counting interval following the first specified counting interval; and
    confirming that the second trigger transmission unit is received by the first transmission unit counter set and by the second transmission unit counter set prior to indicating the fault condition associated with the first specified counting interval.

7. The method of claim 1 wherein indicating the fault condition is performed after confirming that a first trigger transmission unit has been received by the first transmission unit counter set and by the second transmission unit counter set.

8. The method of claim 1 wherein indicating the fault condition is performed after confirming that a second trigger transmission unit, transmission of which occurs after transmission of a first trigger transmission unit, has been received by the first transmission unit counter set and by the second transmission unit counter set.

9. The method of claim 1 wherein:
    performing the first datapath ingress transmission unit counting operation includes tagging transmission units received at a first transmission unit designating location during the first specified counting interval as first designated transmission units and counting said first designated transmission units received at the first counter of the first transmission unit counter set; and
    performing the first datapath egress transmission unit counting operation includes counting said first designated transmission units received at the first counter of the second transmission unit counter set during the first specified counting interval and during the first specified settling interval.

10. The method of claim 9 wherein tagging said transmission units includes setting at least one bit of each said transmission units to a first prescribed setting.

11. The method of claim 10 wherein said at least one bit is located similarly within each one of said transmission units.

12. The method of claim 1 wherein indicating the fault condition associated with the first specified counting interval includes comparing the first datapath ingress transmission unit count with the first datapath egress transmission unit count for determining the difference therebetween.

13. The method of claim 1, further comprising:
initiating a second specified counting interval after the first specified counting interval elapses;
performing a second datapath ingress transmission unit counting operation, of transmission units designated during the second specified counting interval, at a second counter of the first transmission unit counter set in the datapath, wherein a second datapath ingress transmission unit count is determined;
performing a second datapath egress transmission unit counting operation, during a second duration consisting of the second specified counting interval and a second specified settling interval after the second specified counting interval elapses, at a second counter of the second transmission unit counter set in the datapath, wherein a second datapath egress transmission unit count is determined; and
indicating a fault condition associated with the second specified counting interval when a difference is determined between the second datapath ingress transmission unit count and the second datapath egress transmission unit count after the second specified settling interval elapses.

14. The method of claim 1 wherein at least one datapath unit is coupled between the first transmission unit counter set and the second transmission unit counter set.

15. The method of claim 1, further comprising:
performing a first datapath intermediary transmission unit counting operation during the first duration at a first counter of a third transmission unit counter set in the datapath, wherein a first datapath intermediary transmission unit count is determined, the third transmission unit counter set being situated between the first transmission unit counter set and the second transmission unit counter set along the datapath.

16. The method of claim 15 wherein indicating a fault condition further comprises:
comparing the first datapath intermediary transmission unit count to the first datapath ingress transmission unit count to identify a first fault status pertaining to a first portion of the datapath between the first transmission unit counter set and the third transmission unit counter set; and
comparing the first datapath egress transmission unit count to the first datapath intermediary transmission unit count to identify a second fault status pertaining to a second portion of the datapath between the third transmission unit counter set and the second transmission unit counter set.

17. The method of claim 1, further comprising:
performing a first datapath second egress transmission unit counting operation during the first duration at a first counter of a third transmission unit counter set in the datapath, wherein a first datapath second egress transmission unit count is determined, the third transmission unit counter set being situated along a path branching from the datapath between the first transmission unit counter set and the second transmission unit counter set.

18. The method of claim 17 wherein identical transmission units are provided to the second transmission unit counter set and the third transmission unit counter set and wherein indicating a fault condition associated with the first specified counting interval alternatively occurs when a difference is determined between the first datapath ingress transmission unit count and the first datapath second egress transmission unit count after the first specified settling interval elapses.

19. The method of claim 1 wherein performing a first datapath egress transmission unit counting operation is further performed at a first counter of a third transmission unit counter set, the third transmission unit counter set being situated along a path branching from the datapath between the first transmission unit counter set and the second transmission unit counter set, wherein the first datapath egress transmission unit count is further determined according to a sum of a first portion of transmission units counted at the first transmission unit counter Set and a second portion of transmission units counted at the third transmission unit counter set.

20. A method of detecting a transmission unit fault condition, comprising:
performing a first transmission unit counting process for determining a first datapath ingress transmission unit count and a first datapath egress transmission unit count of a datapath, wherein the first datapath ingress transmission unit count is facilitated by a first transmission unit counter of each of a plurality of ingress transmission unit counter sets while processing first transmission units so designated during a first duration consisting of the first specified counting interval and a first specified settling interval after the first specified counting interval elapses, and the first datapath egress transmission unit count is facilitated by a first transmission unit counter of an egress transmission unit counter set during the first duration; and
indicating a fault condition associated with the first specified counting interval when a difference is determined between the first datapath ingress transmission unit count and the first datapath egress transmission unit count after the first specified settling interval elapses.

21. The method of claim 20 wherein determining the first datapath ingress transmission unit count includes summing an ingress transmission unit count facilitated by the first transmission unit counter of each one of said ingress transmission unit counter sets.

22. The method of claim 20 further comprising:
inserting a respective first trigger transmission unit upstream of the first counter of each one of said ingress transmission unit counter sets during the first specified counting interval for activating the first counter of each one of said ingress transmission unit counter sets and the first counter of the egress transmission unit counter set; and
confirming that the respective first trigger transmission unit inserted upstream of the first counter of each one of said ingress transmission unit counter sets is received by the first counter of each one of said ingress transmission unit counter sets and by the first counter of the egress transmission unit counter set prior to indicating the fault condition associated with the first specified counting interval.

23. The method of claim 22, further comprising:
adjusting a counter indicator associated with each one of said ingress transmission unit counter sets to a respective state indicating the first counter of each one of said ingress transmission unit counter sets is active in response to the respective first trigger transmission unit being received by the first counter of a respective one of said ingress transmission unit counter sets;
adjusting a counter indicator associated with the egress transmission unit counter set to a state indicating the first counter of the egress transmission unit counter set is active in response to the first trigger transmission unit being received by the first counter of the egress transmission unit counter set; and
wherein confirming includes verifying that the counter indicator associated with each one of said ingress transmission unit counter sets and the counter indicator associated with the egress transmission unit counter set indicate respective active states prior to indicating the fault condition associated with the first specified counting interval.

24. The method of claim 20 further comprising:
inserting a respective first trigger transmission unit upstream of the first counter of each one of said ingress transmission unit counter sets during the first specified counting interval for activating the first counter of each one of said ingress transmission unit counter sets and the first counter of the egress transmission unit counter set;
inserting a respective second trigger transmission unit upstream of the first counter of each one of said ingress transmission unit counter sets during the first specified counting interval for activating a second counter of each one of said ingress transmission unit counter sets and a second counter of the egress transmission unit counter set; and
confirming that the respective second trigger transmission unit inserted upstream of the first counter of each one of said ingress transmission unit counter sets is received by each one of said ingress transmission unit counter sets and by the egress transmission unit counter set prior to indicating the fault condition associated with the first specified counting interval.

25. The method of claim 20 wherein indicating the fault condition associated with the first specified counting interval is performed after confirming that a respective first trigger transmission unit has been received by the first counter of each one of said ingress transmission unit counter sets and by the first counter of the egress transmission unit counter set.

26. The method of claim 20 wherein performing the first transmission unit counting process includes:
tagging transmission units at a first designating location during the first specified counting interval as first designated transmission units to be received by at least one of said ingress transmission unit counting sets;
counting said first designated transmission units received at said ingress transmission unit counting sets; and
counting said first designated transmission units received at the egress transmission unit counter set during the first duration.

27. The method of claim 26 wherein tagging of said transmission units includes setting at least one bit of each said transmission units to a first prescribed setting.

28. The method of claim 27 wherein said at least one bit is located similarly within each one of said transmission units.

29. The method of claim 20 wherein indicating a fault condition includes comparing the first datapath ingress transmission unit count with the first datapath egress transmission unit count for determining the difference associated with the first specified counting interval.

30. The method of claim 20, further comprising:
initiating a second specified counting interval after the first specified counting interval elapses;
performing a second transmission unit counting process for determining a second datapath ingress transmission unit count and a second datapath egress transmission unit count, wherein the second datapath ingress transmission unit count is facilitated by a second transmission unit counter of said ingress transmission unit counter sets while processing second transmission units so designated during the second specified counting interval and the second datapath egress transmission unit count is facilitated, during a second duration consisting of a second specified counting interval and a second specified settling interval after the second specified counting interval elapses, by a second transmission unit counter of the egress transmission unit counter set; and
indicating a fault condition associated with the second specified counting interval when a difference is determined between the second datapath ingress transmission unit count and the second datapath egress transmission unit count after the second specified settling interval elapses.

31. The method of claim 20 wherein at least one datapath unit is coupled between the ingress transmission unit counter sets and the egress transmission unit counter set.

32. A method of detecting a transmission unit fault condition, comprising:
designating transmission units received at a designating location of a datapath during a first specified counting interval as first designated transmission units;
determining a first datapath ingress transmission unit count for said designated transmission units at a first counting location during a first duration consisting of the first specified counting interval and a first specified settling interval after the first specified counting interval elapses, wherein determining the first datapath ingress transmission unit count is facilitated by a first counter of a transmission unit counter set at the first counting location;
determining a first datapath egress transmission unit count for said designated transmission units at a second counting location of the datapath during the first duration wherein determining the first datapath egress transmission unit count is facilitated by a first counter of a transmission unit counter set at the second counting location; and
indicating a transmission unit fault condition associated with the first specified counting interval when a difference is determined between the first datapath ingress transmission unit count and the first datapath egress transmission unit count after the first specified settling interval elapses.

33. The method of claim 32, further comprising:
inserting a first trigger transmission unit upstream of said first transmission unit counter set for activating the first counter of the transmission unit counter set at the first counting location and the first counter of the transmission unit counter set at the second counting location; and
confirming that the first trigger transmission unit is received by the first counter of the transmission unit counter set at the first counting location and the first counter of the transmission unit counter Set at the second counting location prior to indicating the fault condition associated with the first specified counting interval.

34. The method of claim 33, further comprising:

adjusting a counter indicator associated with the transmission unit counter set at the first counting location to a state indicating the first counter of the transmission unit counter set at the first counting location being active in response to the first trigger transmission unit being received by the first counter of the transmission unit counter set at the first counting location;

adjusting a counter indicator associated with the transmission unit counter set at the second counting location to a state indicating the first counter of the transmission unit counter set at the second counting location being active in response to the first trigger transmission unit being received by the first counter of the transmission unit counter set at the second counting location; and wherein confirming includes checking the states of the counter indicator associated with the transmission unit counter set at the first counting location and the counter indicator associated with the transmission unit counter set at the second counting location prior to indicating the fault condition associated with the first specified counting interval.

35. The method of claim 33 wherein indicating the fault condition associated with the first specified counting interval is performed after confirming that a second trigger transmission unit has been received by the first counter of the first transmission unit counter set and by the first counter of the second transmission unit counter set.

36. The method of claim 32 wherein:

designating said transmission units includes tagging said transmission units as being first designated transmission units when received at the designating location during the first specified counting interval;

determining the first datapath ingress transmission unit count includes counting said first designated transmission units received at the first counter of the transmission unit counting set at the first counting location during the first duration; and determining the first datapath egress transmission unit count includes counting said first designated transmission units received at the first counter of the transmission unit counter set at the second counting location during the first duration.

37. The method of claim 36 wherein tagging said transmission units includes setting at least one bit of each said transmission units to a first prescribed setting.

38. The method of claim 37 wherein said at least one bit is located similarly within each one of said transmission units.

39. The method of claim 32, further comprising:

designating transmission units entering the designating location of the datapath during a second specified counting interval as second designated transmission units;

determining a second datapath ingress transmission unit count for said second designated transmission units received at the first counting location during a second duration consisting of the second specified counting interval after the first specified counting interval elapses and a second specified settling interval after the second specified counting interval elapses, wherein determining the second datapath ingress transmission unit count is facilitated by a second counter of the transmission unit counter set at the first counting location;

determining a second datapath egress transmission unit count for said second designated transmission units received at the second counting location of the datapath adjacent to the first counting location during the second duration, wherein determining the second datapath egress transmission unit count is facilitated by a second counter of the transmission unit counter set at the second counting location; and indicating a transmission unit fault condition associated with the second specified counting interval when a difference is determined between the second datapath ingress transmission unit count and the second datapath egress transmission unit count after the second specified settling interval elapses.

40. The method of claim 32 wherein at least one datapath unit is coupled between the transmission unit counter set at the first counting location and the transmission unit counter set at the second counting location.

41. The method of claim 32, wherein determining the first datapath ingress transmission unit count is further performed at a third counting location and is further facilitated by a first counter of a transmission unit counter set at the third counting location.

42. The method of claim 32, wherein determining the first datapath egress transmission unit count is further performed at a third counting location and is further facilitated by a first counter of a transmission unit counter set at the third counting location.

43. A network system, comprising:

a first transmission unit counter set including a first plurality of counters, wherein the first transmission unit counter set is coupled in a datapath at a first counting location of the datapath and is capable of facilitating a datapath ingress transmission unit count;

a second transmission unit counter set including a second plurality of counters, wherein the second transmission unit counter set is coupled in the datapath at a second counting location of the datapath and is capable of facilitating a datapath egress transmission unit count; and a first datapath unit coupled in the datapath between the first transmission unit counter set and the second transmission unit counter set.

44. The network system of claim 43 further comprising:

a counter activation module coupled in the datapath for activating a first counter of the first plurality of counters and for subsequently activating a second counter of the first plurality of counters.

45. The network system of claim 44 wherein the counter activation module activates the first counter of the first plurality of counters to count a first group of transmission units passing the counter activation module along the datapath during a first period of time.

46. The network system of claim 45 wherein the counter activation module activates the first counter of the first plurality of counters to count a second group of the transmission units passing the counter activation module along the datapath during a second period of time.

47. The network system of claim 46 wherein the counter activation module activates the first counter of the first plurality of counters by tagging the first group of the transmission units.

48. The network system of claim 46 wherein the counter activation module activates the first counter of the first plurality of counters by inserting a trigger transmission unit among the transmission units.

49. A network system, comprising;
- means for performing a first datapath ingress transmission unit counting operation, during a duration consisting of a first specified counting interval and a first specified settling interval after the first specified counting interval elapses, at a first counter of a first transmission unit counter set in a datapath, wherein a first datapath ingress transmission unit count is determined;
- means for performing a first datapath egress transmission unit counting operation during the duration at a first counter of a second transmission unit counter set in the datapath wherein a first datapath egress transmission unit count is determined; and
- means for indicating a fault condition associated with the first specified counting interval when a difference is determined between the first datapath ingress transmission unit count and the first datapath egress transmission unit count after the first specified settling interval elapses.

* * * * *